United States Patent [19]
Yagi

[11] Patent Number: 5,418,726
[45] Date of Patent: May 23, 1995

[54] TRACTION CONTROL APPARATUS FOR AUTOMOTIVE VEHICLE

[75] Inventor: Yoshifumi Yagi, Okazaki, Japan

[73] Assignee: Toyota Jidosha Kabushiki Kaisha, Toyota, Japan

[21] Appl. No.: 117,841

[22] Filed: Sep. 7, 1993

[30] Foreign Application Priority Data

Sep. 9, 1992 [JP] Japan .................. 4-240745

[51] Int. Cl.$^6$ ............................................. B60K 41/20
[52] U.S. Cl. ........................... 364/426.03; 364/424.1; 180/197
[58] Field of Search .............. 364/426.01, 426.02, 364/426.03, 424.1; 180/197; 303/95

[56] References Cited

U.S. PATENT DOCUMENTS

| | | | |
|---|---|---|---|
| 5,076,461 | 12/1991 | Nobumoto et al. | 364/426.03 |
| 5,107,429 | 4/1992 | Sol | 364/426.03 |
| 5,222,570 | 6/1993 | Kawamura et al. | 180/197 |
| 5,262,952 | 11/1993 | Tsuyama et al. | 364/426.03 |

FOREIGN PATENT DOCUMENTS

| | | |
|---|---|---|
| 54-42077 | 12/1979 | Japan . |
| 62-237047 | 10/1987 | Japan . |
| 2-161142 | 6/1990 | Japan . |
| 2-161143 | 6/1990 | Japan . |
| 2-163440 | 6/1990 | Japan . |

*Primary Examiner*—Kevin J. Teska
*Assistant Examiner*—Susan Wieland
*Attorney, Agent, or Firm*—Kenyon & Kenyon

[57] ABSTRACT

A traction control apparatus for carrying out a traction control process of an automotive vehicle in order to control a throttle position of a throttle valve. The apparatus includes: a feedback control part for performing a feedback control process to adjust a throttle position of a sub-throttle valve based on a slip ratio of driving wheels of the vehicle, so as to prevent the vehicle from undergoing excessive slippage at the driving wheels when the vehicle is accelerating; an inhibiting part for setting the throttle position of the throttle valve to a first value by inhibiting the performing of the feedback control process when a traction control process is started; a first control part for enabling the inhibiting part to inhibit the performing of the feedback control process until a slip ratio convergence is detected; and a second control part for setting the throttle position of the throttle valve to a second value smaller than the first value when the driving wheel slip ratio is not converging after the throttle position has been changed to the first value at the start of the traction control process.

10 Claims, 8 Drawing Sheets

40: MAIN THROTTLE VALVE
41: SUB-THROTTLE VALVE

FIG.4A

| | CONDITIONS | CALCULATIONS |
|---|---|---|
| $V_{TS}$ | $V_{TO} \leq 5\,km/h$ | $V_{TO} + KNN1$ |
| | $5\,km/h < V_{TO} \leq 40\,km/h$ | $MAX(V_{TO} + KNN2,\ 5\,km/h + KNN1)$ |
| | $40\,km/h < V_{TO}$ | $MAX(V_{TO} + S \times V_{TO},\ 40\,km/h + KNN2)$ |

FIG.4B

| | LOW ROAD FRICTION | HIGH ROAD FRICTION |
|---|---|---|
| $KNN1\ (km/h)$ | 2.0 | $2.0 + \dfrac{2.0}{0.5} \times \mu_0$ |
| $KNN2\ (km/h)$ | 2.0 | $2.0 + \dfrac{1.5}{0.5} \times \mu_0$ |
| $S\ (\%)$ | 2.8 | $2.8 + \dfrac{2.5}{0.5} \times \mu_0$ |

FIG.6A
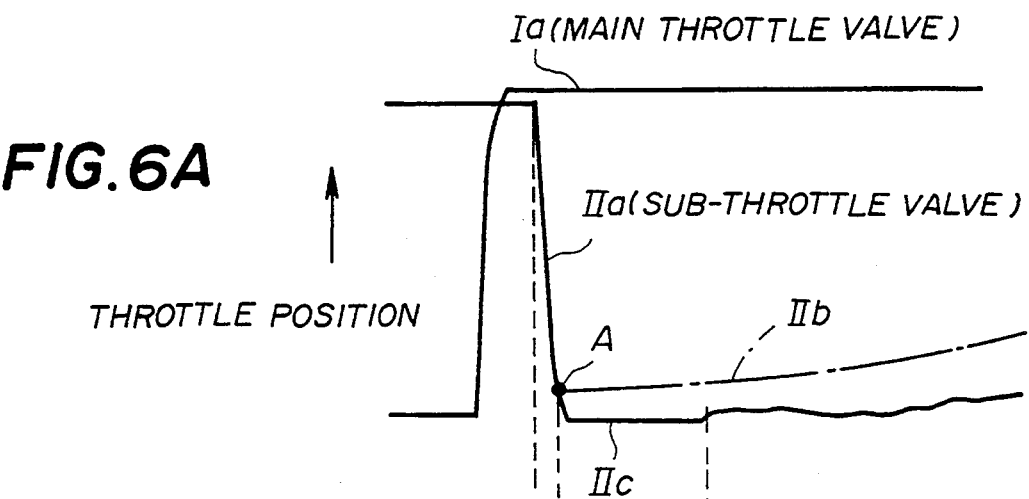
FIG.6B
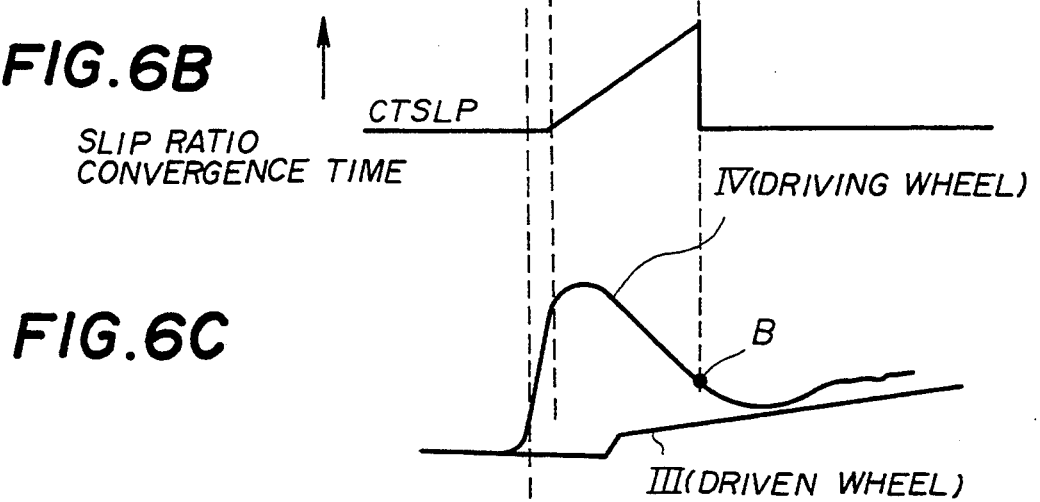
FIG.6C
FIG.6D
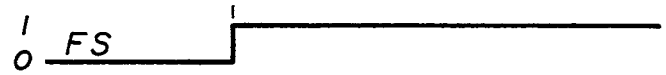
FIG.6E
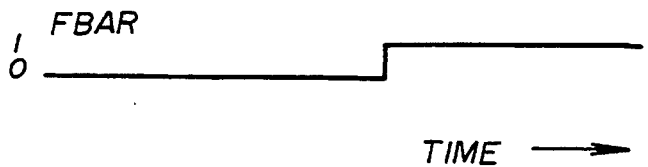

TRACTION CONTROL APPARATUS FOR AUTOMOTIVE VEHICLE

BACKGROUND OF THE INVENTION (1) Field of the Invention

The present invention generally relates to a traction control apparatus for an automotive vehicle, and more particularly to a traction control apparatus for controlling a driving force on driving wheels of the vehicle due to an output torque of an engine, so as to prevent the vehicle from undergoing excessive slippage when the vehicle is accelerating.

(2) Description of the Related Art

When an automotive vehicle is accelerating on a snowy road, the driving force transmitted from the engine to the driving wheel of the vehicle often exceeds the maximum friction force between the wheel and the road. Since the maximum friction force between the wheel and the snowy road is relatively low, the vehicle undergoes excessive slippage at the driving wheels. If the driving wheels slip, a side force acting in the direction of vehicle movement and the side force acting in a direction lateral to the vehicle movement are excessively lowered. As a result, the vehicle acceleration is lowered and the vehicle running condition becomes unstable.

In order to eliminate the above problem, there is a known traction control device for automotive vehicles. In the known traction control device, a slip ratio is determined based on a speed difference between the driving wheel speed and the vehicle running speed, and the driving force produced by the engine is controlled such that the slip ratio is adjusted to be a given target slip ratio.

Japanese Laid-Open Patent Publication No. 2-161142 discloses a traction control device of the kind described above. In the traction control device disclosed in the above mentioned publication, a throttle position of a throttle valve provided in an intake passage of an engine is set to a prescribed value for a high road friction when the execution of the traction control process is started, and a feedback control process (for adjusting the throttle position of the sub-throttle valve) as well as a fuel cut process (for cutting the fuel injected to the engine by a fuel injection valve), is started before the throttle position is subsequently changed. The execution of the fuel cut process ends when the driving wheel rotational acceleration is smaller than a prescribed acceleration value.

If the feedback control process is continuously performed during a time period from the start of the traction control process to the end of the fuel cut process as in the above traction control apparatus, the throttle position of the sub-throttle valve is set to an excessively small value due to the execution of the feedback control process. When the traction control process is started at the end of the fuel cut process, the sub-throttle valve is at such a small throttle position, and the vehicle acceleration is lowered and unstable.

Summary of the Invention

Accordingly, it is a general object of the present invention to provide an improved traction control apparatus in which the above described problems are eliminated.

Another, more specific object of the present invention is to provide a traction control apparatus in which the performing of a throttle position feedback control process is inhibited until a slip ratio convergence is detected, and in which the throttle position of the throttle valve is changed to a value smaller than an initial throttle position value when the slip ratio convergence is not detected at the start of the traction control process.

The above mentioned objects of the present invention are achieved by a traction control apparatus for carrying out a traction control process of an automotive vehicle in which a throttle position of a throttle valve is controlled based on a driving wheel slip ratio. The apparatus comprises: a feedback control part for performing a feedback control process to adjust the throttle position of the throttle valve based on a slip ratio of driving wheels of the vehicle so that to prevent the vehicle from undergoing excessive slippage of the driving wheels when the vehicle is accelerating. The apparatus further includes an inhibiting part for setting the throttle position of the throttle valve to a first value by inhibiting the performance of the feedback control process by the feedback control part when the traction control process is started and a first control part for detecting whether or not the driving wheel slip ratio is converging, and for enabling the inhibiting part to inhibit the performance of the feedback control process until the slip ratio convergence is detected. A second control part sets the throttle position of the throttle valve to a second value smaller than the first value when the first control part detects that the driving wheel slip ratio is not converging after the throttle position of the throttle valve has been changed to the first value at the start of the traction control process.

According to the present invention, it is possible to prevent the vehicle acceleration from being lowered and made unstable due to the throttle position of the throttle valve being changed to an excessively small value when the feedback control process is performed before the driving wheel slip ratio is converging. Also, it is possible to reduce the time from the start of the traction control process to the detection of the slip ratio convergence when the driving wheel slip ratio is relatively great.

Other objects and further features of the present invention will be more apparent from the following detailed description when read in conjunction with the accompanying drawings.

BRIEF DESCRIPTION OF THE DRAWINGS

FIGS. 4A and 4B are tables showing conditions and calculations used to determine a target speed of driving wheels when the traction control process is performed;

FIGS. 6A through 6E are timing charts for explaining the operation of the traction control apparatus according to the present invention.

DESCRIPTION OF THE PREFERRED EMBODIMENT

Figure 1:
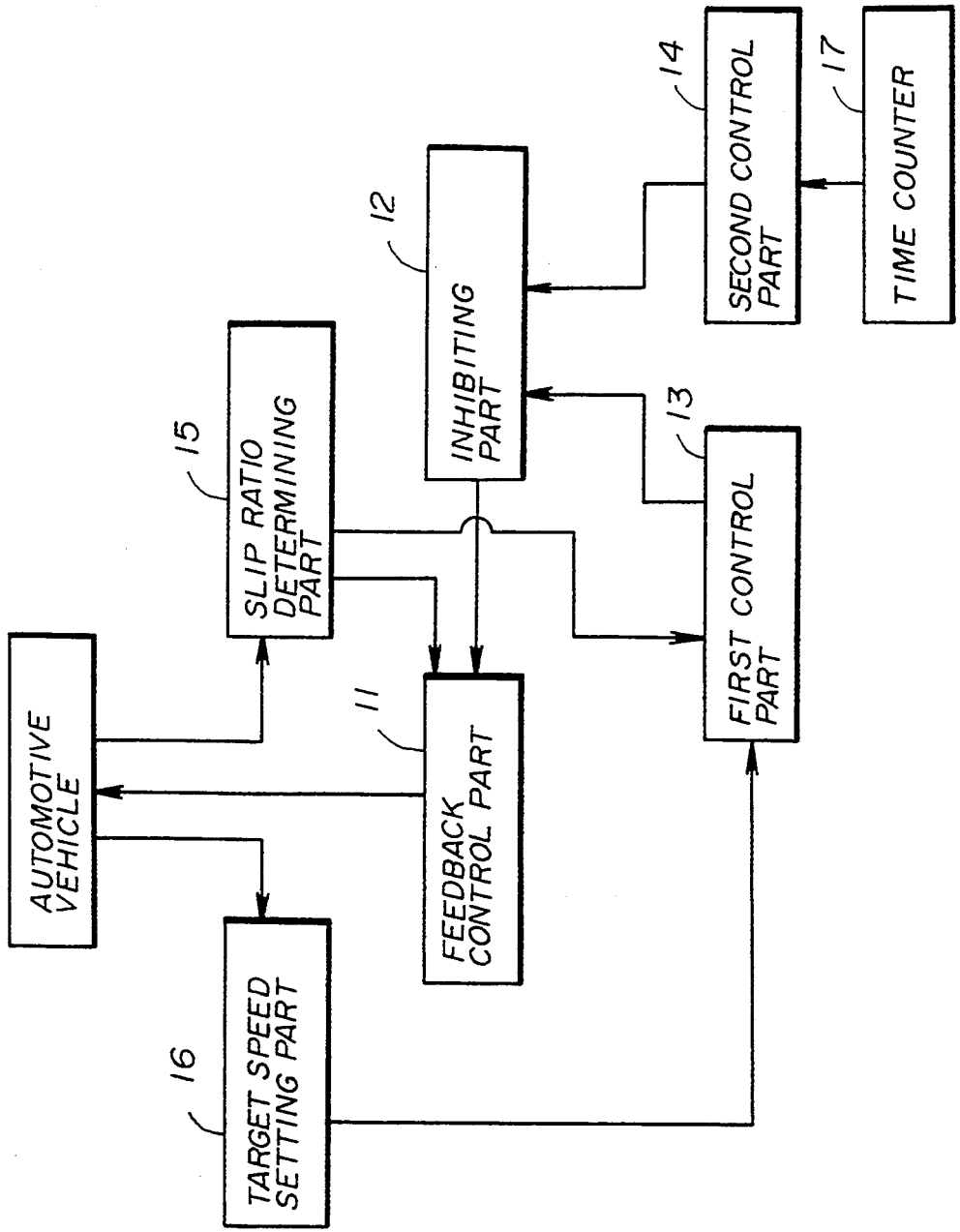
FIG. 1 is a block diagram showing a preferred embodiment of a traction control apparatus according to the present invention.

A description will now be given of a preferred embodiment of a traction control apparatus according to the present invention. FIG. 1 shows a traction control apparatus for carrying out a traction control process of an automotive vehicle in which a throttle position of a throttle valve is controlled based on a driving wheel slip ratio.

In the traction control apparatus shown in FIG. 1, a feedback control part 11 performs a feedback control process to adjust the throttle position of the throttle valve based on a slip ratio of driving wheels of the vehicle, so as to prevent the automotive vehicle from undergoing excessive slippage of the driving wheels when the vehicle is accelerating. An inhibiting part 12 inhibits the performance of the feedback control process when the traction control process is started, and sets the throttle position to a first value. A first control part 13 detects whether or not the driving wheel slip ratio is converging, and enables the inhibiting part 12 to inhibit the performance of the feedback control process until the slip ratio convergence is detected. A second control part 14 sets the throttle position to a second value smaller than the first value when the driving wheel slip ratio is not converging after the throttle position has been changed to the first value at the start of the traction control process.

In the traction control apparatus shown in FIG. 1, a time counter 17 is coupled to the second control part 14 described above. This time counter 17 measures a time period between a time when the throttle position of the throttle valve is set to the second value and a time when it is detected that the driving wheel slip ratio is converging after the setting of the throttle position to the second value. When it is detected that the driving wheel slip ratio is converging after the throttle position of the throttle valve has been changed to the second value, the second control part 14 sets the throttle position to a third value which is predetermined in accordance with the time period measured by the time counter 17.

In the traction control apparatus shown in FIG. 1, a slip ratio determining part 15 is coupled to the above described feedback control part 11 and first control part 13. This slip ratio determining part 15 determines a driving wheel slip ratio based on a speed difference between a target driving wheel speed and an actual driving wheel speed. The target driving wheel speed is derived from a road condition, and the driving wheel speed is the average of driving wheel speeds indicated by signals output from speed sensors on the driving wheels of the vehicle. In the above described apparatus, a target speed setting part 16 is coupled to the first control part 13. The target speed setting part 16 sets a target throttle position of the throttle valve based on a previous target throttle position and a correction amount, so that the throttle valve is operated based on the target throttle position to control the driving force of the driving wheels.

Next, a description will be given, with reference to FIG. 2, of an automotive vehicle to which the traction control apparatus shown in FIG. 1 is applied.

Figure 2:
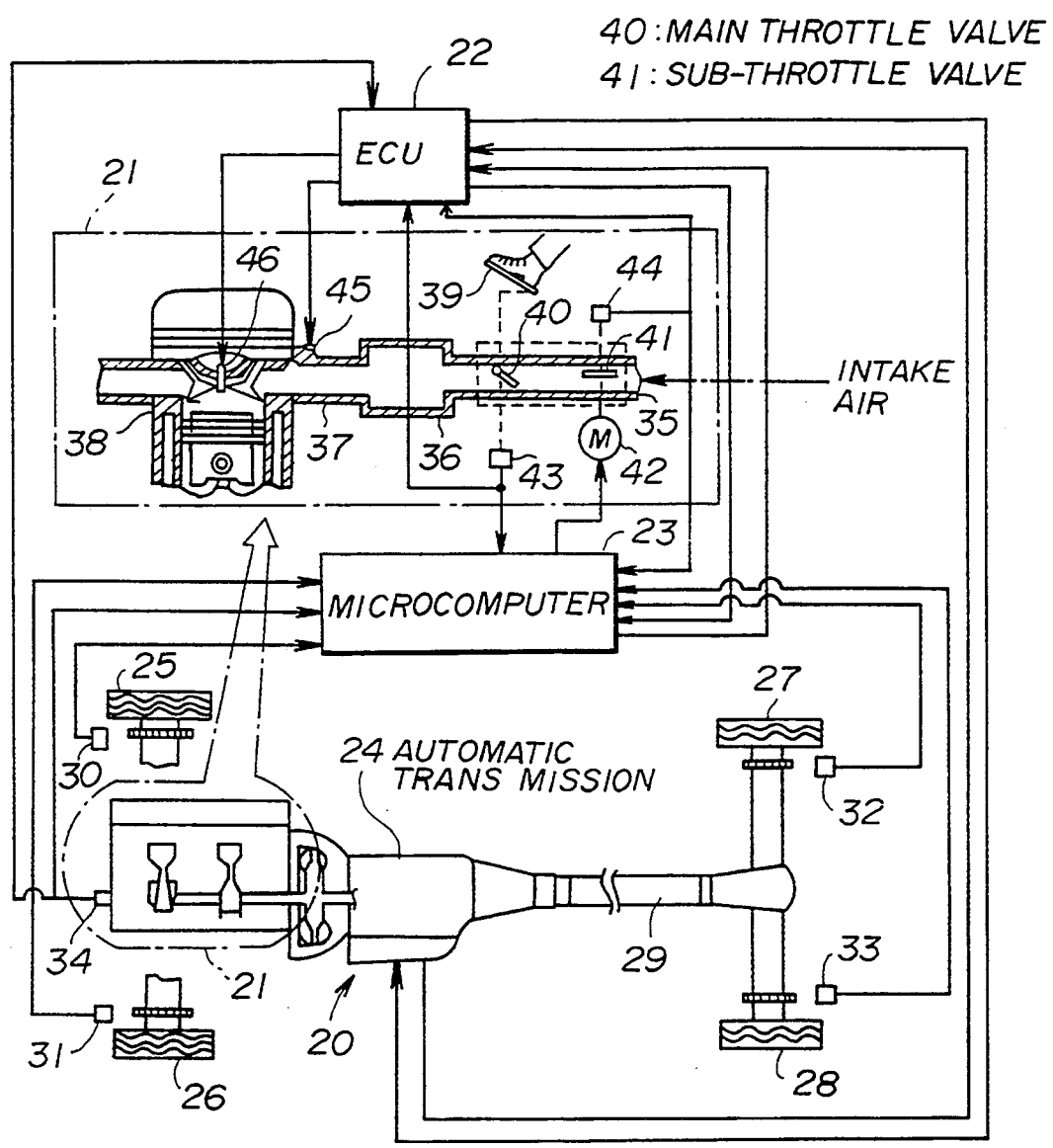
FIG. 2 is a system diagram showing an automotive vehicle to which the traction control apparatus shown in FIG. 1 is applied.

FIG. 2 schematically shows a rear-wheel-driven automotive vehicle 20 with an engine 21, an electronic control unit (ECU) 22, a microcomputer 23, and an automatic transmission 24. The automotive vehicle 20 has front wheels 25 and 26 which are driven wheels, and has rear wheels 27 and 28 which are driving wheels. An output shaft of the engine 21 is coupled to a torque converter of the automatic transmission 24. Thus, driving power from the engine 21 is transmitted from the automatic transmission 24 to the rear wheels 27 and 28 via a drive shaft 29 so that the vehicle 20 is propelled by the driving force from the rear wheels 27 and 28.

In the automotive vehicle 20 shown in FIG. 2, wheel speed sensors 30 and 31 are provided at the front wheels 25 and 26 to sense the rotational speed of each of the front wheels. Wheel speed sensors 32 and 33 are provided at the rear wheels 27 and 28 to sense the rotational speed of the rear wheels. An engine speed sensor 34 is mounted on the engine 21 to sense the rotational speed of the crankshaft of the engine 21. This rotational speed is called an engine speed. A signal indicating the engine speed sensed by the engine speed sensor 34 is supplied to both the ECU 22 and the microcomputer 23. Signals indicating the wheel speeds sensed by the wheel speed sensors 30–33 are respectively supplied to the microcomputer 23.

An intake passage of the engine 21 is made up of an intake pipe 35, a surge tank 36, and an intake manifold 37. This intake passage communicates with a combustion chamber 38 of the engine 21 so that intake air is fed into the engine 21 in a direction indicated by an arrow in FIG. 2. Within the intake pipe 35, a main throttle valve 40 and a sub-throttle valve 41 upstream of the main throttle valve 40 are provided. A throttle position (or a throttle opening) of the main throttle valve 40 is adjusted in response to the position of an accelerator pedal 39 set by a vehicle operator, in order to control the flow of intake air. Independently of the operation of the main throttle valve 40, a throttle position of the sub-throttle valve 41 is adjusted by a throttle valve actuator 42 such as a stepping motor. This throttle valve actuator 42 is operated by a control signal supplied from the microcomputer 23, so as to adjust the throttle position of the sub-throttle valve 41.

As shown in FIG. 2, a throttle position sensor 43 is mounted so as to sense the throttle position of the main throttle valve 40, and outputs a signal indicating the throttle position of the valve 40 to both the ECU 22 and the microcomputer 23. Also, a throttle valve sensor 44 is mounted so as to sense the throttle position of the sub-throttle valve 41, and outputs a signal indicating the throttle position of the valve 41 to both the ECU 22 and the microcomputer 23.

The ECU 22 is made up of a digital computer, and carries out a fuel injection control process and an ignition timing control process. A fuel injection valve 45 is provided in the intake manifold 37 so as to inject fuel into the engine 21 in accordance with a fuel injection time. In order to determine the fuel injection time, the ECU 22 carries out the fuel injection control process in accordance with the signals supplied from the engine speed sensor 34, the throttle position sensors 43, 44, and other sensors (not shown in FIG. 2). A spark plug 46 is provided in the combustion chamber 38. In order to determine an ignition timing of the spark plug 46, the ECU 22 also carries out the ignition timing control process in accordance with the signals supplied from the engine speed sensor 34, the throttle position sensors 43, 44, and other sensors (not shown).

Moreover, the ECU 22 carries out a shifting control process for the automatic transmission 24 in accordance with various signals including: the throttle position signal supplied from the main throttle sensor 43; a shift position signal supplied from the automatic transmission 24; a vehicle speed signal supplied from a vehicle speed sensor (not shown); and a control signal supplied from the microcomputer 23. This shifting control process is carried out in order to determine a shift position of the automatic transmission 24 which is appropriate for the vehicle running conditions.

In the automotive vehicle shown in FIG. 2, a traction control process according to the present invention (which will be described later) is carried out by the microcomputer 23. The engine speed signal from the engine speed sensor 34, the wheel speed signals from the wheel speed sensors 30–33, and the throttle position signals from the throttle position sensors 43 and 44 are input to the microcomputer 23. In accordance with the input signals, the microcomputer 23 carries out the traction control process to control the output torque of the engine 21. A drive signal indicating the result of the traction control process is output to the throttle valve actuator 42, and the throttle position of the sub-throttle valve 41 is adjusted by the actuator 42. The output torque of the engine 21 is thus controlled when the traction control process is performed. Signals supplied from the microcomputer 23 to the ECU 22 include: a TRC signal indicating whether the traction control process is being performed, a fuel cut signal indicating whether the fuel injection valve 45 is operated under the fuel cut condition, and an ignition delay signal indicating whether the ignition timing of the spark plug 46 is delayed.

In the automotive vehicle 20 shown in FIG. 2, the drive torque of the engine 21 during the traction control process is controlled by setting the throttle position of the sub-throttle valve 41. More specifically, in the traction control apparatus of the present invention, a throttle position Ts of the sub-throttle valve 41 is determined in accordance with a slip ratio dV with respect to the rear wheels 27 and 28 (the driving wheels), as follows.

$$Ts(n) = Ts(n-1) + (dTs/dt) \, To \quad (1)$$

$$(dTs/dt) = K1 \, dV + K2 \, K3 \, dG \quad (2)$$

In the above formula (1): "Ts(n)" denotes a target throttle position of the sub-throttle valve 41 to be determined; "Ts(n−1)" denotes a previously determined throttle position of the sub-throttle valve 41; and "To" denotes a time period on which the traction control process is repeated. In the above formula (2): "K1", "K2" and "K3" are coefficients having positive values; "dV" denotes a speed difference between a target driving wheel speed Vt3 (determined from a vehicle running speed or driven wheel speed) and the actual driving wheel speed Vd; and "dG" denotes a difference between the changing rate of the vehicle speed Vto and the changing rate of the driving wheel speed Vd. In the traction control apparatus shown in FIG. 1, the driving wheel slip ratio is defined as the speed difference dV (=Vt3−Vd). The difference "dG" is indicated by its absolute value as in the equation: dG = |(dVto/dt) − (dVd/dt)|.

Figure 3A:
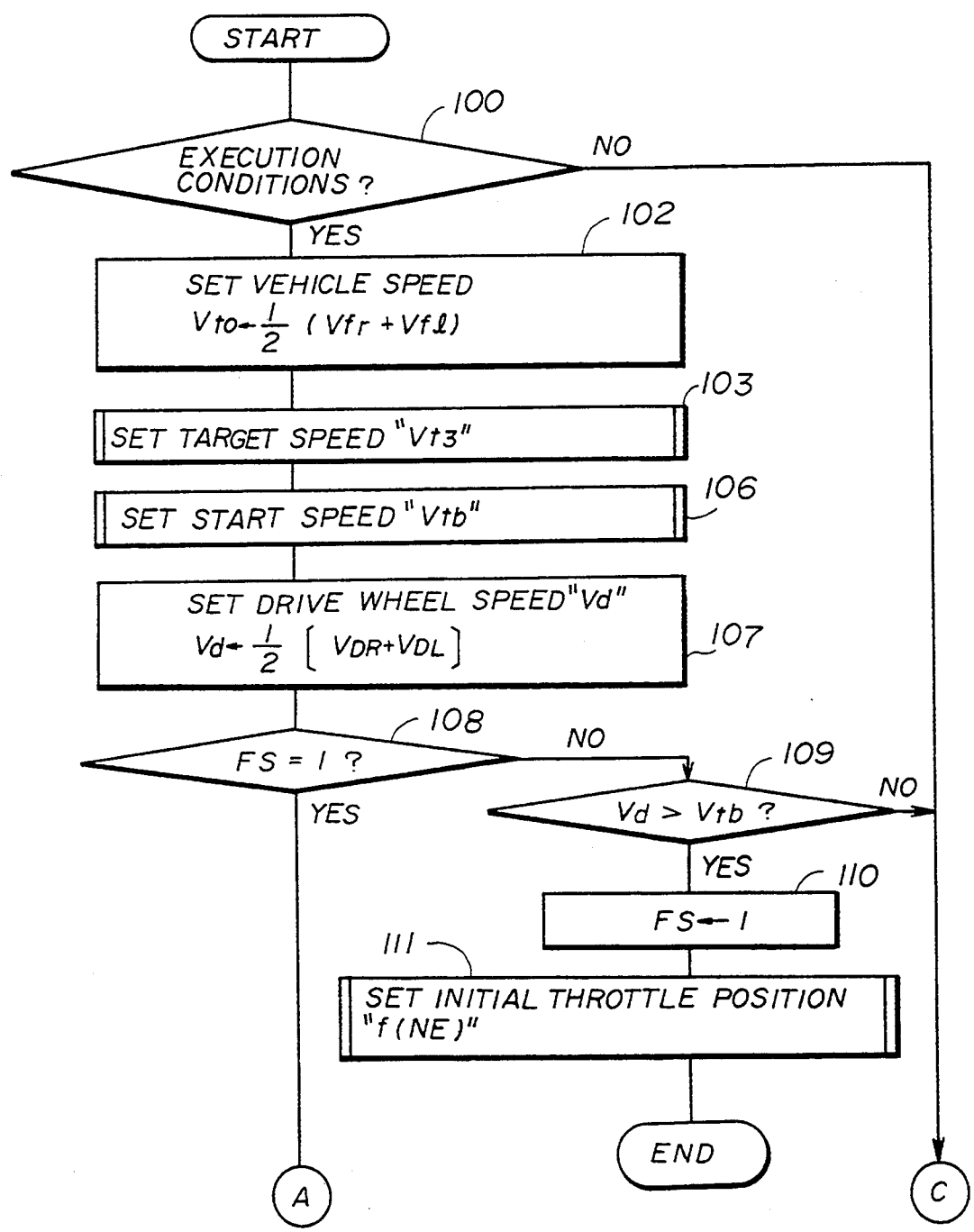
FIGS. 3A, 3B and 3C are a flowchart for explaining a traction control process performed by a control unit of the automotive vehicle shown in FIG. 2.
Figure 3B:
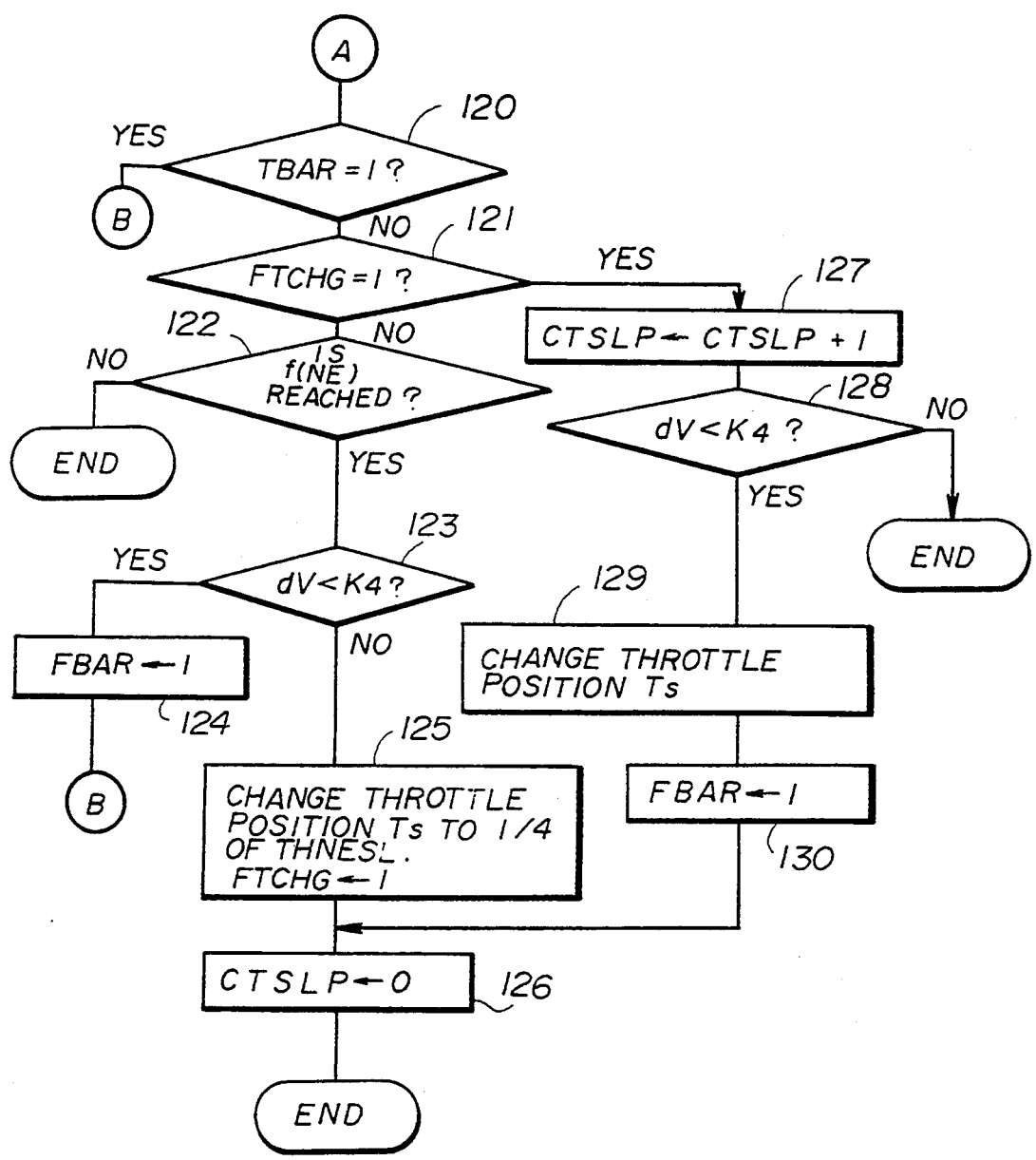
Figure 3C:
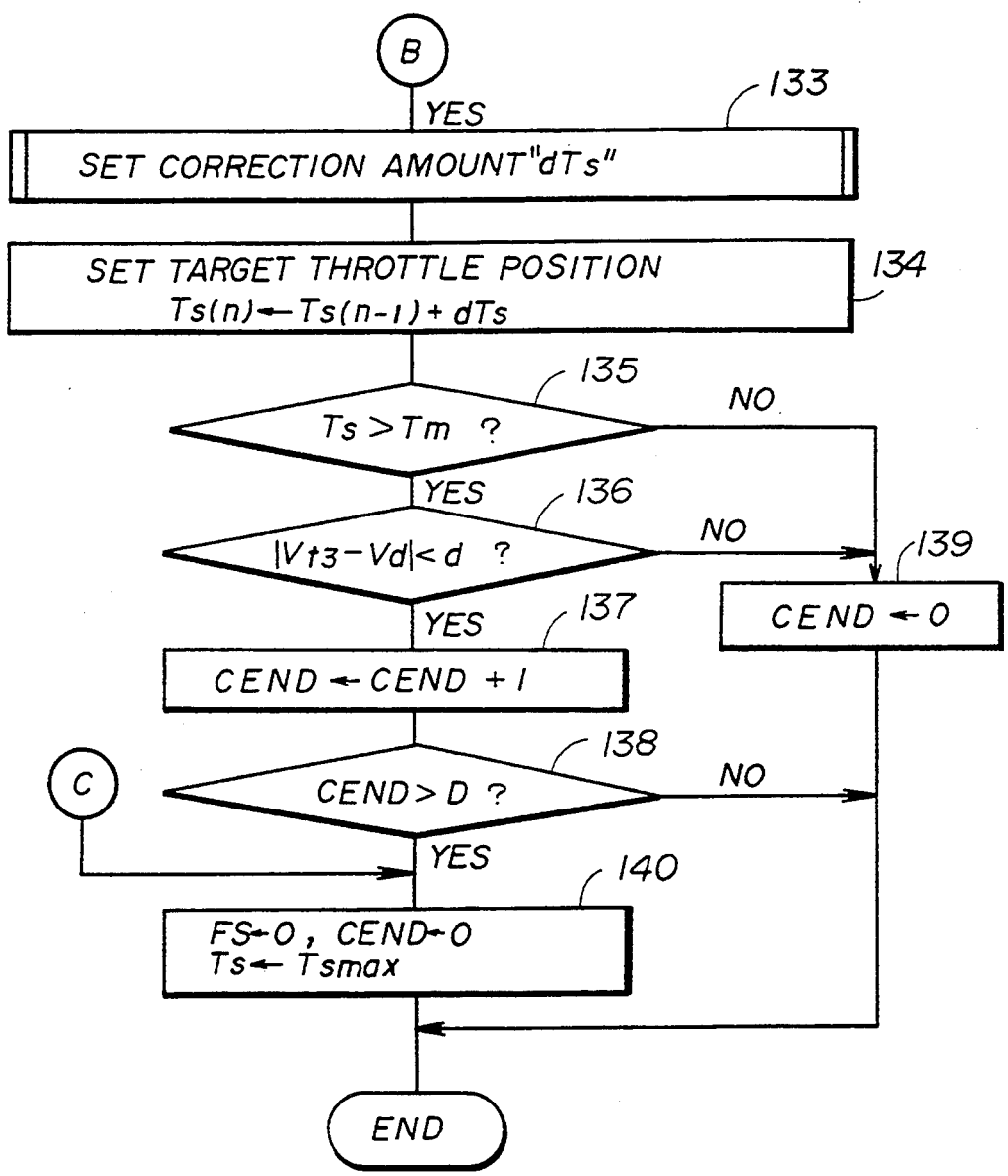

Next, a description will be given, with reference to FIGS. 3A through 3C, of a traction control process performed by the traction control apparatus according to the present invention. FIGS. 3A through 3C show the traction control process performed by the traction control apparatus of the present invention. This process is repeatedly performed by the microcomputer 23 of the vehicle in FIG. 2 every 12 milli-seconds (ms).

In the traction control process in FIG. 3A, step 100 detects whether or not the execution conditions for starting the traction control process are satisfied. The execution conditions include: 1) the throttle position Tm of the main throttle valve 40 is not set to the minimum opening position, and 2) none of the relevant sensors mentioned above are malfunctioning. If any of the execution conditions are not satisfied, step 140 shown in FIG. 3C is performed and the traction control process ends. In step 140, flags FS and CEND (described below) are reset to zero, and the throttle position Ts of the sub-throttle valve 41 is set to a maximum throttle position Tsmax.

If the execution conditions are satisfied in step 100, the reading of speed parameters from the relevant sensors and the associated calculations are performed by the microcomputer 23 in steps 102–107.

Step 102 sets a vehicle speed Vto by taking the average of a right-hand front wheel speed Vfr and a left-hand front wheel speed Vfl respectively indicated by the wheel speed signals output from the sensors 30 and 31, in accordance with the equation: Vto = (Vfr + Vfl)/2.

Step 103 sets a target speed Vt3 of the rear wheels 27 and 28 (the driving wheels) based on the value of the vehicle speed Vto in step 102.

The target speed Vt3 of the driving wheels is determined in accordance with the conditions and calculations indicated in FIG. 4A, as follows.

1) when Vto ≦ 5 km/h, Vt3 = (Vto + Knn1) km/h,
2) when 5 km/h < Vto ≦ 40 km/h, Vt3 is set to the greater one of (Vto + Knn2) and (5 km/h + Knn1),
3) when Vto > 40 km/h, Vt3 is set to the greater one of (Vto + S Vto) and (40 km/h + Knn2),
   where Knn1 and Knn2 are given coefficients,
   S denotes a target slip ratio.

The coefficients Knn1 and Knn2 and the target slip ratio S are preset to be either one of two values as indicated in FIG. 4B. If the road friction force is relatively low, these coefficients Knn1, Knn2 and S are preset to the values at the left-hand column of the table in FIG. 4B. If the road friction force is relatively high, these coefficients Knn1, Knn2 and S are preset to the values in the right-hand column of the table. The coefficient "μo" indicated in FIG. 4B is derived from the friction force "μ" according to the following equation:

$$\mu = [(mf + mr)/mr] a/gm \quad (3)$$

where "mf" is the weight of the front wheels 25 and 26, "mr" is the weight of the rear wheels 27 and 28, "a" is the vehicle acceleration, and "gm" is the acceleration due to gravity.

The vehicle acceleration "a" in the equation (3) is calculated from the changing rate of the rotational speeds Vfl and Vfr of the front wheels 25 and 26 indicated by the signals output from the sensors 30 and 31. Alternatively, the vehicle acceleration "a" is derived from a signal output by an acceleration sensor (not shown) provided in the automotive vehicle.

It should be noted that the target speed Vt3 of the driving wheels is set to be a value greater than the vehicle speed Vto, such that the vehicle undergoes a desired slippage. When the vehicle speed Vto is relatively low, the target slip ratio S (=(Vt3−Vto)/Vto) has a relatively large value, which ensures increased vehicle acceleration. When the vehicle speed Vto is relatively high, the target slip ratio S has a relatively small value. The traction control with respect to the side force is preferentially performed rather than the traction control with respect to the drive force, which ensures increased straight line stability of the vehicle. The value of the target speed Vt3 of the driving wheels set in step 103 corresponds to the value of the target slip ratio S.

After step 103 is performed, step 106 sets a start speed Vtb at which a throttle position feedback control process (which will be described later) is started. When a driving wheel speed is increased to this start speed Vtb, the throttle position feedback control process is started. The start speed Vtb in step 103 is determined in accordance with the equation:

$$Vtb = Vt3 + B \quad (B: \text{a given coefficient}) \quad (4)$$

For the sake of simplicity, the coefficient B is preset in accordance with the vehicle speed and the road condition. According to the equation (4), the start speed Vtb is set to a value greater than the target speed Vt3, thus preventing the frequency of the traction control process from being high.

After step 106 is performed, step 107 sets a driving wheel speed Vd by taking the average of a right-hand rear wheel speed Vdr and a left-hand rear wheel speed Vdl respectively indicated by the signals output from the wheel speed sensors 32 and 33, in accordance with the equation: Vd=(Vdr+Vdl)/2.

Step 108 detects whether or not a throttle position control flag FS is equal to 1. Since the initial value of the flag FS is equal to 0, the answer to step 108 is, initially, negative. If FS=0, step 109 is performed. However, the throttle position control flag FS will be subsequently set to 1. If FS=1, step 120 in FIG. 3B is performed, which step will be described later.

Step 109 detects whether or not the driving wheel speed Vd is greater than the start speed Vtb. If Vd≦Vtb, the driving wheel speed does not reach the start speed at which the throttle position feedback control process is to be started. Then, step 140 in FIG. 3C is performed and the traction control process ends. In step 140, the flags FS and CEND are reset to zero and the throttle position Ts of the sub-throttle valve is set to the maximum throttle position Tsmax.

If the answer to step 109 is affirmative (Vd>Vtb), the driving wheel speed reaches the start speed. Steps 110 and 111 are performed, and then the traction control process ends. Step 110 sets the flag FS to 1 (FS→1). Step 111 sets the throttle position Ts of the sub-throttle valve 41 to an initial throttle position f(NE) (Ts→f(NE)).

Figure 5:
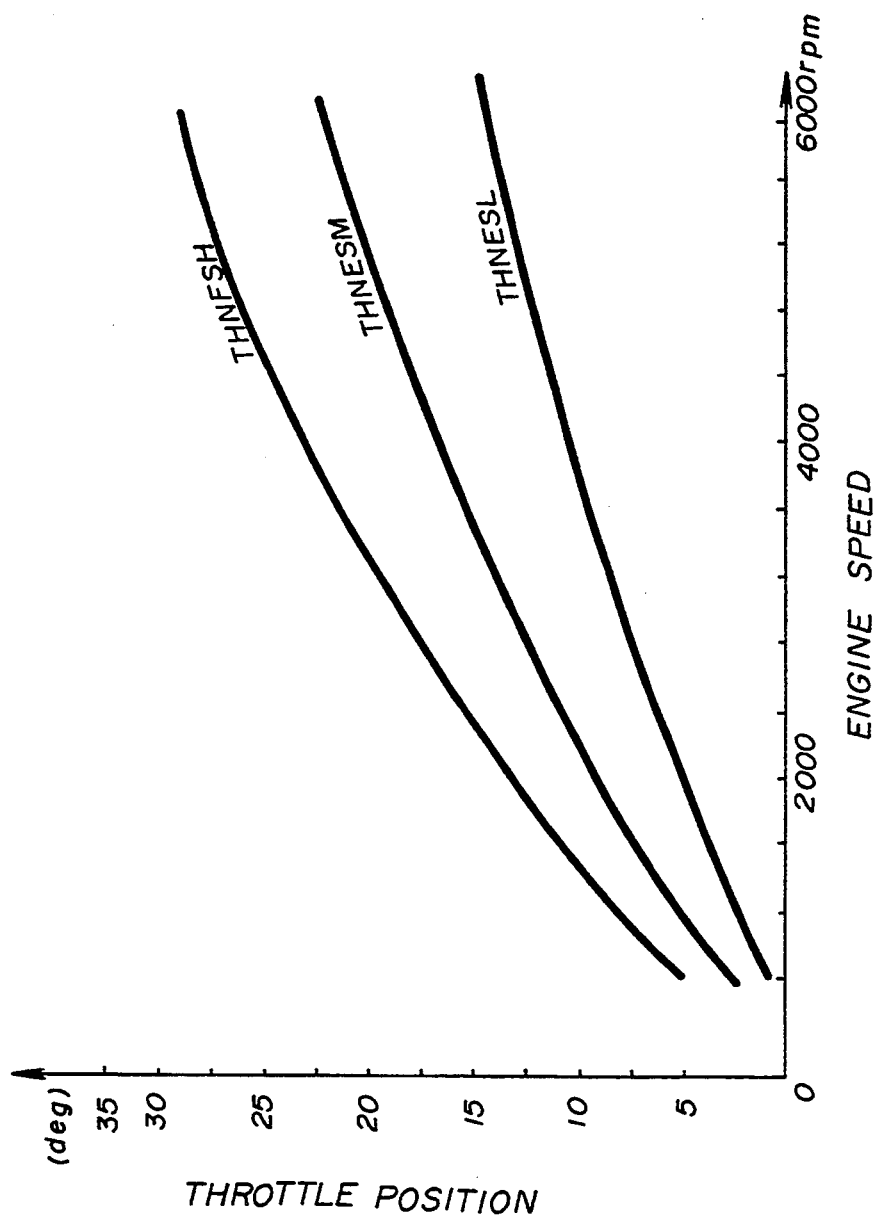
FIG. 5 is a chart showing three types of throttle position curves for defining a road-friction-dependent throttle position value according to an engine speed, which value is used in the traction control process.

FIG. 5 shows three types of throttle position curves for defining a road-friction-dependent throttle position value in accordance with an engine speed. A throttle position value, obtained from one of the three curves in accordance with the engine speed, is used by the traction control apparatus of the present invention to set the throttle position of the sub-throttle valve 41. Each throttle position value of the three curves, as a function of the engine speed, speed is stored in a memory of the microcomputer 23. A high-road-friction throttle position curve THNESH in FIG. 5 defines a throttle position value as a function of the engine speed when the road friction force is relatively high. A low-road-friction throttle position curve THNESL in FIG. 5 defines a throttle position value as a function of the engine speed when the road friction force is relatively low. A middle-road-friction throttle position curve THNESM in FIG. 5 defines a throttle position value as a function of the engine speed when the road friction force is intermediate.

The initial throttle position f(NE) in step 111 is defined from a value of the high-road-friction throttle position curve THNESH in FIG. 5 which value is defined as a function of the engine speed NE. The engine speed NE is indicated by the signal output from the engine speed sensor 34.

In the automotive vehicle shown in FIG. 2, the sub-throttle valve 41 is always set to the maximum throttle position while the throttle position feedback control process is not performed. If the throttle position feedback control process is started when the sub-throttle valve 41 is at the maximum throttle position, it will take a certain time before the vehicle response to a change in the throttle position of the sub-throttle valve 41 becomes sensitive. In order to obtain a sensitive response quickly after the throttle position feedback control process is started, the sub-throttle valve 41 is set to the initial throttle position f(NE) in step 111.

If the answer to step 108 is affirmative (FS=1), step 120 in FIG. 3B is performed. Step 120 detects whether or not a feedback enable flag FBAR is equal to 1. Since the initial value of the feedback enable flag FBAR is equal to 0, the answer to step 120 is, initially, negative. If FBAR=0, step 121 is performed. Step 121 detects whether or not an initial throttle position change flag FTCHG is equal to 1. Since the initial value of the initial throttle position change flag FTCHG is equal to 0, the answer to step 121 is, initially, negative. If FTCHG=0, step 122 is performed.

Step 122 detects whether or not the throttle position of the sub-throttle valve 41 indicated by the signal output from the throttle position sensor 44 in FIG. 2 reaches the initial throttle position Ts (=f(NE)) previously set in step 111. If the answer to step 122 is negative, the traction control process ends. If the answer to step 122 is affirmative, step 123 is performed.

Step 123 detects whether or not the driving wheel slip ratio dV (=(Vt3−Vd)) is smaller than a prescribed reference value K4. In step 123, it is determined whether or not the driving wheel slip ratio is converging due to the road friction force. The driving wheel slip ratio dV is indicated by the difference between the target driving wheel speed Vt3 (step 103) and the driving wheel speed Vd (step 107). If the slip ratio dV is smaller than the reference value K4 (dV<K4), it is determined that the driving wheel slip ratio is converging. Then, step 124 sets the feedback enable flag FBAR to 1. After step 124 is performed, the throttle position feedback control procedure (steps 133–139 in FIG. 3C) is started.

If step 123 detects that the slip ratio dV is not smaller than the reference value K4 (dV≧K4), it is determined that the driving wheel slip ratio is still not converging due to a relatively low road friction force, and step 125 is performed. In step 125, the initial throttle position Ts of the sub-throttle valve 41 is changed to ¼ of a value from the low-road-friction throttle position curve THNESL in FIG. 5, and the initial throttle position change flag FTCHG is set to 1. In step 125, a value from the low-road-friction throttle position curve THNESL according to the engine speed NE indicated by the output signal of the engine speed sensor 34 is retrieved from the memory of the microcomputer 23. It should be noted that the throttle position (the second value) set in step 125 is smaller than the throttle position (the first value) set in step 111. After step 125 is performed, step 126 resets a convergence time counter CTSLP to zero, and the traction control process ends.

If the answer to step 121 is affirmative (FTCHG=1; the initial throttle position has been changed), step 127 increments the convergence time counter CTSLP (CTSLP→CTSLP+1). Step 128 detects whether or not the driving wheel slip ratio dV is smaller than the reference value K4. If the answer to step 128 is negative ($dV \geq K4$), it is determined that the driving wheel slip ratio is not converging, and then the traction control process ends. If the answer to step 128 is affirmative ($dV<K4$), it is determined that the driving wheel slip ratio is converging, and then step 129 is performed.

Step 129 changes the throttle position Ts of the sub-throttle valve 41 to a value based on the value of the convergence time counter CTSLP. The value of the convergence time counter CTSLP at this time indicates a time period from the reaching of the initial throttle position f(NE) (step 122) to the detection of the driving wheel slip ratio convergence (step 128). Thus, the convergence time counter value varies depending on the road condition in which the vehicle is running. More specifically, in step 129, the throttle position Ts is changed to a value from the high-road-friction throttle position curve THNESH based on the engine speed NE when the convergence time counter CTSLP is smaller than or equal to 96 ms ($=12$ ms$\times 8$). When the convergence time counter CTSLP is between 96 ms and 204 ms ($=12$ ms$\times 17$), the throttle position Ts is changed to a value from the middle-road-friction throttle position curve THNESM based on the engine speed NE. When the convergence time counter CTSLP is between 204 ms and 504 ms ($=12$ ms$\times 42$), the throttle position Ts is changed to $\frac{1}{2}$ of a value from the curve THNESM based on the engine speed NE. When the convergence time counter CTSLP is greater than 504 ms, the throttle position Ts is changed to 1/5 of a value from the curve THNESM based on the engine speed NE.

After step 129 is performed, step 130 sets the feedback enable flag FBAR to 1 so that the execution of the throttle position feedback control process is allowed. After step 130 is performed, the step 126 described above is performed to reset the convergence time counter CTSLP to zero. Then, the traction control process ends.

If the answer to step 120 is affirmative (TBAR=1), or after step 124 is performed ($dV<K4$), steps 133 and 134 shown in FIG. 3C (the throttle position feedback control procedure) are performed.

Step 133 sets a correction amount dTs which is used to determine a target throttle position Ts(n) of the sub-throttle valve 41. This correction amount dTs is indicated by the second term "(dTs/dt) To" of the equation (1) above.

Step 134 sets the target throttle position Ts(n) of the sub-throttle valve 41 based on the previously set target throttle position Ts(n−1) and the correction amount dTs. The values Ts(n−1) and dTs are stored in the memory of the microcomputer 23. In step 134, the target throttle position Ts(n) of the sub-throttle valve 41 is determined in accordance with the equation: Ts(n)=Ts(n−1)+dTs. A signal indicating the thus determined target throttle position Ts is output by the microcomputer 23 to operate the throttle valve actuator 42. Therefore, the throttle position of the sub-throttle valve 41 is set to an appropriate value.

The throttle position feedback control procedure described above is finished after it is confirmed that three requirement conditions in step 135, 136, and 137–139 are satisfied. Step 135 detects whether or not the throttle position Ts of the sub-throttle valve 41 is greater than a throttle position Tm of the main throttle valve 40. If the answer to step 135 is negative, step 139 is performed, and then the traction control process ends. Step 139 resets a time counter CEND to zero.

If the answer to step 135 is affirmative, step 136 is performed. Step 136 detects whether or not the absolute value of the slip ratio dV (=the speed difference (Vt3−Vd) is less than a prescribed value "d". If the answer to step 136 is negative, the above step 139 is performed, and then this process ends. If the answer to step 136 is affirmative, step 137 is performed. Step 137 increments the time counter CEND (CEND→CEND+1).

After step 137 is performed, step 138 detects whether or not the time counter CEND is greater than a prescribed time D. If the time counter CEND is greater than the prescribed time D, it is determined that a time period during which the vehicle is operating under the requirement conditions of Ts>Tm and dV<d is greater than the prescribed time D. If the answer to step 138 is affirmative, all the requirement conditions are satisfied, and the above step 140 is performed, then the traction control process ends.

If the answer to step 138 is negative, then the traction control process ends and no other steps are performed. The value d in step 116 and the time D in step 118 are predetermined depending on the type of the vehicle to which the traction control apparatus of the present invention is applied. When all the three requirement conditions of step 135–139 are satisfied, it is determined that the vehicle does not undergo driving wheel slippage although the sub-throttle valve 41 is opened more widely than the main throttle valve 40. Thus, in the above described traction control process, the throttle position feedback control procedure is completed at this time.

Next, a description will be given, with reference to FIGS. 6A through 6E, of the operation of the traction control apparatus according to the present invention.

FIG. 6A shows changes in the throttle positions of the main throttle valve 40 and the sub-throttle valve 41 when the vehicle is accelerating. In FIG. 6A, the change in the throttle position of the main throttle valve 40 is indicated by a solid line Ia, and the change in the throttle position of the sub-throttle valve 41 is indicated by a solid line IIa.

FIG. 6D shows a change of the throttle position control flag FS. When the main throttle valve 40 is set to the maximum throttle position as indicated by the line Ia in FIG. 6A and the driving wheel speed Vd is greater than the start speed Vtb, the flag FS is set to 1 as indicated in FIG. 6D. In response to the setting of the flag FS, the throttle position Ts of the sub-throttle valve 41 is changed to the initial throttle position f(NE) (=THNESH) indicated by a time point A on the line IIa in FIG. 6A.

After the time point A, if the slip ratio dV is detected as being smaller than the reference value K4, the execution of the throttle position feedback control process is allowed because it is determined that the driving wheel slip ratio is converging. The throttle position Ts of the sub-throttle valve 41 is gradually increasing as indicated by a dotted line IIb in FIG. 6A.

Conversely, after the time point A, if the driving wheel speed indicated by a solid line IV in FIG. 6C is greater than the driven wheel speed (or the vehicle speed) indicated by a solid line III in FIG. 6C, the slip ratio dV is not smaller than the reference value K4 (dV≧K4). It is then determined that the driving wheel slip ratio is not converging. The execution of the throttle position feedback control process is inhibited, and the throttle position Ts of the sub-throttle valve 41 at this time is changed to ¼ of a value from the low-road-friction throttle position curve THNESL (shown in FIG. 5). The change in the throttle position Ts is indicated by a solid line IIc in FIG. 6A.

FIG. 6B shows a change of the convergence time counter CTSLP. After the throttle position Ts is changed to ¼ of the value from the curve THNESL, the convergence time counter CTSLP is incremented during the time period between the time point A and a time point B (in FIG. 6C), as indicated in FIG. 6B. When it is detected at the time point B that the slip ratio dV is smaller than the reference value K4 because the speed difference between the driving wheel speed and the vehicle speed has decreased, the throttle position Ts of the sub-throttle valve 41 is changed to a value based on the value of the incremented counter CTSLP at that time.

FIG. 6E shows a change of the feedback enable flag FBAR. At the same time as the throttle position Ts is changed at the time point B, the feedback enable flag FBAR is set to 1, so as to allow the execution of the throttle position feedback control procedure.

In the above described embodiment, during a time period from the start of the traction control process to the detection of the slip ratio convergence: dV<K4, the performance of the throttle position feedback control procedure is inhibited. Thus, it is possible to prevent the sub-throttle valve 41 from being closed to an excessively small throttle position due to the performance of the throttle position feedback control procedure.

If the slip ratio is detected as not converging when the throttle position Ts of the sub-throttle valve has reached the value derived from the high-road-friction throttle position curve THNESH, the throttle position Ts is changed to the value derived from the low-road-friction throttle position curve THNESL (which value is smaller than the THNESH value). Thus, it is possible to reduce the time between the start of the traction control process and the detection of the slip ratio convergence during which the driving wheel slip ratio is relatively great.

The throttle position Ts of the sub-throttle valve 41 is changed to a value in accordance with the convergence time counter CTSLP value. This counter value indicates the time for the convergence of the driving wheel slippage. Thus, the throttle position Ts of the sub-throttle valve 41 is changed to a value appropriate for the road condition according to the present invention.

Further, the present invention is not limited to the above described embodiment, and variations and modifications may be made without departing from the scope of the present invention.

What is claimed is:

1. A traction control apparatus for carrying out a traction control process of an automotive vehicle in which a throttle angle of a first throttle valve is controlled based on a driving wheel slip ratio, the apparatus comprising:
    feed back control means for performing a feedback control process to adjust the throttle angle of the first throttle valve based on a slip ratio of the driving wheels of the vehicle, to reduce slippage of the driving wheels when the vehicle is accelerating;
    inhibiting means for inhibiting the performance of the feedback control process by the feedback control means, wherein, each time the traction control process is started, the inhibiting means initially sets the throttle angle of the first throttle valve to a first value;
    first control means for detecting whether the driving wheel slip ratio is converging, wherein the first control means directs the inhibiting means to continue to inhibit the performance of the feedback control process until convergence of the slip ratio to a slip ratio convergence value is detected; and
    second control means for setting the throttle angle of the first throttle valve to a second value smaller than the first value when, after the throttle angle of the first throttle valve has been changed to the first value at the start of the traction control process, the first control means detects that the driving wheel slip ratio is not converging.

2. A traction control apparatus according to claim 1, further comprising driving wheel speed sensors which output signals indicative of a current speed of the driving wheels of the vehicle, wherein the first control means, to determine whether the driving wheel slip ratio is converging, determines whether a difference between a target driving wheel speed and the current driving wheel speed is smaller than a prescribed reference value, the target driving wheel speed being derived from a road condition.

3. A traction control apparatus according to claim 2, wherein said first control means detects that the driving slip ratio is converging when the difference between the target driving wheel speed and the current driving wheel speed is smaller than the reference value, and detects that the driving wheel slip ratio is not converging the difference between the target driving wheel speed and the current driving wheel speed is at least as large as the reference value.

4. A traction control apparatus according to claim 1, wherein the first control means detects whether the driving wheel slip ratio is converging only after the throttle angle of the first throttle valve has been changed to the first value.

5. A traction control apparatus according to claim 1, wherein the first control means detects whether the driving wheel slip ratio is converging after the throttle angle of the first throttle valve has been changed to the second value.

6. A traction control apparatus according to claim 1, wherein the second control means sets the throttle angle of the first throttle valve to a third value when the first control means detects that the driving wheel slip ratio is converging after the throttle angle has been changed to the second value at the start of the traction control process, wherein the third value is predetermined in accordance with a time period between a time when the throttle angle was set to the second value and a time when the slip ratio convergence is detected.

7. A traction control apparatus according to claim 1, further comprising time counter means coupled to the second control means for measuring a time period between a time when the throttle angle of the first throttle valve was set to the second value and a time after the setting of the throttle angle to the second value when it is detected that the driving wheel slip ratio is converging.

8. A traction control apparatus according to claim 1, further comprising driving wheel speed sensors, each driving wheel speed sensor outputting a signal indicative of a current speed of a respective driving wheel of the vehicle, and slip ratio determining means coupled to the feedback control means and to the first control means, the slip ratio determining means determining a driving wheel slip ratio based on a difference between a target driving wheel speed and an average current driving wheel speed, wherein the target driving wheel speed is derived from a road condition, and wherein the average current driving wheel speed is the average of driving wheel speeds indicated by the signals output by the driving wheel speed sensors.

9. A traction control apparatus according to claim 1, further comprising target speed setting means coupled to the first control means, wherein the target speed setting means sets a current target throttle angle of the first throttle valve based on a previous target throttle angle and a correction amount, so that the first throttle valve is operated based on the current target throttle angle.

10. A traction control apparatus according to claim 1, further comprising a second throttle valve, wherein the second throttle valve is operated in accordance with a position of an accelerator pedal controlled by an operator of the vehicle.

* * * * *

UNITED STATES PATENT AND TRADEMARK OFFICE
CERTIFICATE OF CORRECTION

PATENT NO. : 5,418,726
DATED : May 23, 1995
INVENTOR(S) : Yoshifumi YAGI

It is certified that error appears in the above-indentified patent and that said Letters Patent is hereby corrected as shown below:

Column 2, line 13, delete the colon after "comprises".

Column 2, line 17, change "so that" to --so as--.

Column 7, line 52, change "(FS$\rightarrow$1)." to --(FS$\leftarrow$1).--.

Column 7, line 55, change "(Ts$\rightarrow$f(NE))." to --(Ts$\leftarrow$f(NE)).--.

Column 7, line 64, delete the first "speed,".

Column 9, line 12, change "(CTSLP$\rightarrow$CTSLP+1)." to --(CTSLP$\leftarrow$CTSLP+1).--.

Column 12, line 46, after "ing" insert --when--.

Signed and Sealed this

Fifth Day of December, 1995

Attest:

Attesting Officer

BRUCE LEHMAN
Commissioner of Patents and Trademarks